United States Patent [19]

Kondo et al.

[11] 4,014,809

[45] Mar. 29, 1977

[54] PROCESS FOR OBTAINING A POLYOL-CONTAINING HOMOGENEOUS LIQUID COMPOSITION USEFUL FOR THE PRODUCTION OF RIGID POLYURETHANE FOAM FROM A RIGID POLYURETHANE FOAM

[75] Inventors: Osamu Kondo; Torao Hashimoto; Hajime Hasegawa, all of Yokohama, Japan

[73] Assignee: Bridgestone Tire Company Limited, Tokyo, Japan

[22] Filed: Dec. 19, 1975

[21] Appl. No.: 642,634

[30] Foreign Application Priority Data

Dec. 19, 1974 Japan ............................ 49-144995

[52] U.S. Cl. .............................. 252/182; 260/2.3
[51] Int. Cl.$^2$ .................. C09K 3/00; B29H 19/00; C08J 11/04
[58] Field of Search ...................... 260/2.3; 252/182

[56] References Cited

UNITED STATES PATENTS

| 3,114,722 | 12/1963 | Einhorn et al. | 260/2.3 X |
| 3,143,515 | 8/1964 | Hurley | 260/2.3 |
| 3,300,417 | 1/1967 | McElroy | 260/2.3 |
| 3,378,497 | 4/1968 | Lanhan | 252/182 |
| 3,404,103 | 10/1968 | Matsudaira et al. | 260/2.3 |
| 3,441,616 | 4/1969 | Pizzini et al. | 260/2.3 X |

*Primary Examiner*—Edward A. Miller
*Attorney, Agent, or Firm*—Sughrue, Rothwell, Mion, Zinn & Macpeak

[57] ABSTRACT

A process for obtaining a polyol-containing homogeneous liquid composition, which can be directly reused as a polyol component for the production of rigid polyurethane foam, from a rigid polyurethane foam, which comprises treating said foam at a temperature of from 150° to 220° C in the presence of a mixture of (a) an aliphatic diol having 4–7 carbon atoms and having a boiling point higher than 160° C and (b) a monoalkanolamine having 2 to 8 carbon atoms, the amount of said monoalkanolamine (b) present in said mixture being within the range of from 1 to 20 percent by weight.

5 Claims, No Drawings

PROCESS FOR OBTAINING A POLYOL-CONTAINING HOMOGENEOUS LIQUID COMPOSITION USEFUL FOR THE PRODUCTION OF RIGID POLYURETHANE FOAM FROM A RIGID POLYURETHANE FOAM

BACKGROUND OF THE INVENTION

1. Field of the Invention

The present invention relates to a method for obtaining a polyol-containing homogeneous liquid composition from a rigid polyurethane foam in a short time. The polyol-containing homogeneous liquid composition forms a one-layered liquid substantially composed of polyol, and can be directly reused as a polyol component for the production of rigid polyurethane foam.

2. Description of the Prior Art

There have been proposed various methods for recovering polyol from a polyurethane foam by the degradation of the polyurethane. Among them, the method disclosed in U.S. Pat. No. 3,404,103 is particularly exellent. In this method, a polyurethane foam is thermally degraded in a mixture system composed of an alkaline solution added with an amine compound. However, this method has the drawback that the recovered degradation product forms two layers and cannot be directly reused as a raw material for polyurethane foam, and the polyol component must be separated and recovered from the recovered degradation product and then reused for the production of polyurethane foam. Further, there are disclosed in Japanese Patent Laid Open Specification No. 28,407/73 and No. 93,696/73 methods wherein waste polyurethane or polyisocyanurate foam is degraded in the presence of two kinds of dihydroxy-compounds composed of an aliphatic diol and a dialkanolamine, and is recovered in the form of polyol. However, in these methods, a long time is required for the degradation, and a particularly long time is required for the degradation at a low temperature.

SUMMARY OF THE INVENTION

According to the present invention, there is provided a process for obtaining a polyol-containing homogeneous liquid composition, which can be directly reused as a polyol component for the production of rigid polyurethane foam, from a rigid polyurethane foam, which comprises treating said rigid polyurethane foam at a temperature of from 150° to 220° C in the presence of a mixture of (a) an aliphatic diol having 4 to 7 carbon atoms and having a boiling point higher than 160° C and (b) a monoalkanolamine having 2 to 8 carbon atoms, the amount of said monoalkanolamine (b) present in said mixture being within the range of from 1 to 20 percent by weight.

According to another aspect of the present invention, there is provided a process for obtaining a polyol-containing homogeneous liquid composition, which can be directly reused as a polyol component for the further production of rigid polyurethane foam, from a chipped or waste rigid polyurethane foam which causes occasionally pollution.

It is an object of the present invention to provide an effective process to degradate thermally the chipped or waste rigid polyurethane foam and to obtain the polyol-containing homogeneous liquid composition from said polyurethane. According to the process of the present invention, the treating temperature for the degradation of said polyurethane is relatively low, the time for the degradation is short, and the recovered degradation product is one-layered liquid and can be reused as a polyol component without the separation and purification of the polyol. Moreover, the process can be easily carried out even under a low temperature condition, because the melting point of monoalkanolamine used in the process is relatively high.

It is another aspect of the present invention to provide a safe process for degradating rigid polyurethane foam, because monoalkanolamine to be used in the process is less poisonous than di- or trialkanolamine.

It is a further aspect of the present invention to provide an economical process for the degradation of rigid polyurethane foam, because the reagents used in the process are cheap, the apparatus for the degradation is simple, and the processability is good.

DETAILED DESCRIPTION OF THE PREFERRED EMBODIMENTS

The rigid polyurethane foam to be thermally degraded according to the present invention is at least one selected from the class consisting of so called rigid polyurethane foam and rigid polyisocyanurate foam. Semi-rigid type polyurethane foam or flexible polyurethane foam may also be applicable to the degradation according to the present invention with or without said rigid polyurethane foam.

The solvent to be used in the present invention is a mixture of (a) an aliphatic diol and (b) a monoalkanolamine. The aliphatic diols (a) are ones having 4 to 7 carbon atoms and having a boiling point higher than 160° C, and include 1,3-butanediol, 1,4-butanediol, 2,3-butanediol, 2-methyl-2,4-pentanediol, 1,5-pentanediol, 2,4-pentanediol, 2,5-hexanediol, 2,4-heptanediol, 2-ethyl-1,3-hexanediol, diethylene glycol, dipropylene glycol, triethylene glycol and the like. Among them, aliphatic diols having 4 to 6 carbon atoms are preferably used. Particularly, diethylene glycol, dipropylene glycol, 1,4-butanediol and 1,5-pentanediol and preferably used. When aliphatic diols having not more than 3 or not less than 8 carbon atoms are used, the recovered degradation produt is not a homogeneous liquid, but is a very viscous paste or separates into two liquid layers, and therefore the handling of the degradation product is very disadvantageous at the reuse thereof. On the contrary, when the aliphatic diols having 4 to 7 carbon atoms defined in the present invention are used, the recovered degradation product is a homogeneous liquid having a low viscosity and is easy to handle, and can be directly reused as a polyol component for the production of rigid polyurethane foam without the separation and recovering of polyol.

The monoalkanolamines (b) are ones having 2 to 8 carbon atoms, and include monoethanolamine, diethylethanolamine, aminoethylethanolamine and the like. Among them, monoethanolamine is particularly preferable. However, dialkanolamine and trialkanolamine, such as diethanolamine, triethanolamine and the like, are poor in the property for lowering the degradation temperature of rigid polyurethane foam, and are not used in the present invention.

The amount of monoalkanolamine (b) to be contained in the mixture of an aliphatic diol (a) and a monoalkanolamine (b) used as a solvent in the present invention should be not larger than 20% by weight. In general, a solvent containing 1 to 20% by weight of monoalkanolamine is effectively used, and particularly a solvent containing about 2 to 10% by weight of monoalkanolamine is preferably used. In the method of the present invention, as the amount of monoethanolamine present in the solvent is increased, the degradation of rigid polyurethane foam proceeds more rapidly, but when the recovered degradation product is directly reused as a polyol component for the production of rigid polyurethane foam, a large amount of monoalkanolamine is incorporated into the resulting polyurethane foam, and the properties of the foam are deteriorated. Therefore, in the present invention, the upper limit of the amount of monoalkanolamine to be contained in the solvent is limited to 20% by weight.

In the method of the present invention, rigid polyurethane foam is degraded at a temperature of 150° to 220° C. When the treating temperature is lower than 150° C, although the degradation reaction proceeds, the degradation rate is very slow, and such low temperature is not practicable. While, when the treating temperature is higher than 220° C, the degradation rate is higher, but there is a fear that the polyol formed by the degradation is further decomposed and the properties of the rigid polyurethane foam produced by the use of the degradation product are deteriorated. Therefore, such high treating temperature is not preferable.

The solvent to be used in the present invention must be a mixture of an aliphatic diol and a monoalkanolamine as described above. Particularly, monoalkanolamine develops an excellent effect which cannot be developed by other similar amines, such as dialkanolamine and trialkanolamine. That is, the use of monoalkanolamine has the following merits. When a mixture of an aliphatic diol and a monoalkanolamine is used as a solvent, the degradation time is shorter than the case where an aliphatic diol is used alone or in admixture with an amine other than monoalkanolamine as a solvent, and further the degradation reaction can be proceeded at a sufficiently high reaction rate at a relatively low temperature.

The polyol-containing homogeneous liquid composition obtained by the method of the present invention, that is, the recovered degradation product of the present invention is one-layered liquid, in which a polyol used for the production of, for example, rigid polyurethane foam, a polyol presumably having such a chemical structure that the isocyanate group of polyisocyanate used for the production of the rigid polyurethane foam is reacted with one of the hydroxyl groups of aliphatic diol used as a solvent in the production of the polyurethane foam, and a solvent used in the degradation reaction are homogeneously mixed. It has been found from the analysis of the recovered degradation product that the product can be directly reused as a polyol component for the production of rigid polyurethane foam, and rigid polyurethane foam having a satisfactorily excellent property has been actually produced from the product. The degradation product obtained by conventional methods separates into two layers or is a viscous paste, and cannot be directly reused for the production of rigid polyurethane foam. The present invention has succeeded in obtaining a degradation product of rigid polyurethane foam in the form of a homogeneous liquid by using a specifically limited solvent. Therefore, the present invention is very valuable in industry.

The following examples are given for the purpose of illustration of this invention and are not intended as limitations thereof. In the examples, "parts" and "%" mean by weight.

As the rigid polyurethane foam to be used in the thermal degradation of the following examples, the following rigid polyurethane foams (A) and (B) were produced. The formulation in the production and the physical properties of the polyurethane foams are shown in the following Tables 1 and 2.

Table 1

| Rigid polyurethane foam (A) | |
|---|---|
| Formulation (Parts) | |
| Sucrose-base polyol (OH-value 455) | 100 |
| Dibutyltin laurate | 0.1 |
| Dimethylethanolamine | 1.0 |
| Surfactant: SH-193 (Silicone oil made by Toray Silicone Co.) | 1.5 |
| Foaming agent: Freon-11 | 45 |
| NCO prepolymer (sucrose-base polyol) prepolymer containing 30% of NCO) | 120 |
| Physical properties of foam | |
| Specific gravity | 0.030 |
| Compression strength in foaming direction (Kg/cm$^2$) | 1.5 |
| Compression strength in transverse direction (Kg/cm$^2$) | 0.87 |
| Bending strength in foaming direction (Kg/cm$^2$) | 3.5 |

Table 2

| Rigid polyurethane foam (B) | |
|---|---|
| Formulation (Parts) | |
| SU-450M (sucrose-base polyol made by Sanyo Kasei Co.) | 90 |
| Glycerine-base triol (MW 1,000, OH-value 160) | 5 |
| RQ 300 (OH-value 770, a crosslinking agent made by Japan Reichhold Chemical CO.) | 5 |
| Dimethylethanolamine | 1.5 |
| Flame retardant: TDCP (made by Daihachi Kagaku Co.) | 25 |
| Foaming agent: Freon-11 | 40 |
| Surfactant: SH-193 | 1.8 |
| MR (MDI made by Nippon Polyurethane Co.) | 120 |
| Physical properties of foam | |
| Specific gravity | 0.029 |
| Compression strength in foaming direction (Kg/cm$^2$) | 2.3 |
| Compression strength in transverse direction (Kg/cm$^2$) | 0.9 |
| Bending strength in foaming direction (Kg/cm$^2$) | 2.3 |

EXAMPLE 1

A flask of 3$l$ capacity equipped with a thermometer, a cooling condenser, an inlet for charging foam and a stirrer was placed in a mantle heater. Into the flask were charged 475 g of diethylene glycol and 25 g of monoethanolamine, and the resulting mixture was heated to 195°±5° C. Then, 500 g of flakes of rigid polyurethane foam (A) was added to the solution at a rate of 10 g per minute while stirring.

After the added polyurethane was wholly dissolved, the resulting solution was further stirred for about 30 minutes while keeping at 195°±5° C, and then the reaction product was cooled to room temperature. The obtained product was a brown homogeneous liquid and weighed 877 g. The following Table 3 shows the result of the analysis of this liquid.

Table 3

| Viscosity (cp) | pH | Hydroxyl value (mgKOH/g) | Acid value (mgKOH/g) | Water content (%) |
|---|---|---|---|---|
| 1,420 (31° C) | 7.3 | 605 | 1.55 | 1.81 |

It was found from the above obtained data that the recovered liquid as such could be satisfactorily used as a polyol component for the production of rigid polyurethane foam.

Then, a rigid polyurethane foam was produced by the use of the above recovered liquid (referred to as recovered polyol (I)). The following Table 4 shows the formulation in the production of the polyurethane foam and the physical properties of the resulting polyurethane foam. It can be seen from Table 4 that the resulting polyurethane foam, although slightly brown, can be satisfactorily used as a heat insulating material.

Table 4

| Formulation (Parts) | |
|---|---|
| SU-450M | 60 |
| Recovered polyol (I) | 40 |
| A 33% solution of triethylene-diamine in dipropylene glycol | 0.1 |
| Dimethylethanolamine | 2.0 |
| Foaming agent: Freon-11 | 35 |
| Surfactant: SH-193 | 1.0 |
| MR (MDI) | 136 |
| Physical properties of foam | |
| Specific gravity | 0.028 |
| Compression strength in foaming direction (Kg/cm²) | 2.33 |
| Compression strength in transverse direction (Kg/cm²) | 0.92 |
| Dimensional change at high temperature in foaming direction (70° C × 48 hrs.) (%) | −0.40 |
| Dimensional change at low temperature in foaming direction (−30° C × 12 hrs.) (%) | −0.92 |
| Thermal conductivity (Kcal/m.h. ° C) | 0.0172 |
| Bending strength in foaming direction (Kg/cm²) | 3.2 |

EXAMPLE 2

In a solvent composed of 450 g dipropylene glycol and 50 g of monoethanolamine was heat treated 500 g of rigid polyurethane foam (A) at 180°±5° C in the same manner as described in Example 1. In this treatment, the polyurethane foam was added in 110 minutes, and after the addition, the mass was kept at 180°±5° C for 45 minutes to dissolve completely the polyurethane foam.

The resulting product was cooled to room temperature to obtain 834 g of a brown homogeneous liquid. The following Table 5 shows the result of analysis of the resulting liquid.

Table 5

| Viscosity (cp) | pH | Hydroxyl value (mgKOH/g) | Acid value (mgKOH/g) | Water content (%) |
|---|---|---|---|---|
| 6,340 (31° C) | 8.0 | 480.2 | 0.80 | 1.02 |

It was found from the above obtained data that the recovered liquid as such could be satisfactorily used as a polyol component for the production of rigid polyurethane foam.

Then, a rigid polyurethane foam was produced by the use of the above recovered liquid (referred to as polyol (II)). The following Table 6 shows the formulation in the production of the polyurethane foam and the physical properties of the resulting polyurethane foam. The resulting polyurethane foam is slightly brown, but the foam can be satisfactorily used as a heat insulating material.

Table 6

| Formulation (Parts) | |
|---|---|
| SU-450M | 50 |
| Recovered polyol (II) | 50 |
| RQ 300 | 15 |
| A 33% solution of triethylene-diamine in dipropylene glycol | 0.1 |
| Dimethylethanolamine | 2.0 |
| Freon-11 | 35 |
| PAPI (polyphenyl polyisocyanate made by Kasei Upjohn Co.) | 187 |
| Physical properties of foam | |
| Specific gravity | 0.029 |
| Compression strength in foaming direction (Kg/cm²) | 2.63 |
| Compression strength in transverse direction (Kg/cm²) | 1.20 |
| Dimensional change at high temperature (70° C × 48 hrs.) (%) | −0.65 |
| Dimensional change at low temperature (−30° C × 24 hrs.) (%) | −0.90 |
| Thermal conductivity (Kcal/m.h. ° C) | 0.0183 |
| Bending strength in foaming direction (Kg/cm²) | 3.0 |

EXAMPLES 3 AND 4, AND COMPARATIVE EXAMPLES 1–4

100 g of rigid polyurethane foam (A) was thermally degraded in the same manner as described in Example 1. The solvent, the degradation temperature, the degradation time and the properties of the degradation product are shown in the following Table 7. The experiments of Examples 3 and 4, and Comparative Examples 1–4 show the influence of aliphatic diol to be used in the solvent when monoethanolamine is used as a monoalkanolamine and the kind of aliphatic diol is varied.

It can be seen from Table 7 that, when a mixed solvent composed of an aliphatic diol and an amine, both defined in the present invention, is used, the degradation time can be shortened and further the degradation reaction can be proceeded at a relatively low temperature.

That is, it was found that, when dipropylene glycol was used as an aliphatic diol (Comparative Example 1), the polyurethane foam was degraded, but a high degradation temperature and a long degradation time were needed. Further, although the resulting degradation product formed one layer, the product was a viscous paste, and it was almost impossible to reuse directly the degradation product as a polyol component for the production of rigid polyurethane foam.

Further, when PPG diol 400 (diol made by Mitsui Toatsu Co., molecular weight 400, Comparative Example 2), PPG diol 1000 (diol made by Mitsui Toatsu Co., molecular weight 1,000, Comparative Example 3) or SU-450M (polyol made by Sanyo Kasei Co., Comparative Example 4), all of PPG 400, PPG 1000 and SU-450M having carbon numbers larger than the carbon numbers of the aliphatic diol used in the present invention, was used, a fairly high degradation temperature was required, and further the degradation time was longer than that in the present invention. Moreover, the resulting degradation product forms two layers, and the resulting two layers must be separated. However, the lower layer is paste, and high technique is required for the separation. Therefore, it is expensive to reuse the degradation product of the above described methods.

degrade the polyurethane in a relatively low temperature.

EXAMPLE 7

In the same manner as described in Example 1, 700 g of rigid polyurethane foam (B), which is a flame resistant polyurethane foam, was heat treated at 180°±5° C in a solvent composed of 665 g of diethylene glycol and 35 g of monoethanolamine. That is, the total amount of 700 g of rigid polyurethane foam (B) was added in 115

Table 7

|  | Example | | Comparative Example | | | |
|---|---|---|---|---|---|---|
|  | 3 | 4 | 1 | 2 | 3 | 4 |
| Solvent (g) | | | | | | |
| 1,4-Butane diol | 95 | | | | | |
| 1,5-Pentane diol | | 95 | | | | |
| Propylene glycol | | | 95 | | | |
| PPG diol 400 | | | | 95 | | |
| PPG diol 1000 | | | | | 95 | |
| SU 450M | | | | | | 95 |
| Monoethanolamine | 5 | 5 | 5 | 5 | 5 | 5 |
| Degradation condition | | | | | | |
| Temperature (° C) | 195 | 170 | 198–200 | 205 | 210 | |
| Time (min) | 20 | 26 | 40 | 36 | 28 | 37 |
| Properties of degradation product | | | | | | |
| Appearance (after cooled to room temperature) | One-layered homogeneous liquid | One-layered homogeneous liquid | One-layered paste | Separated into two layers Upper layer: liquid Lower layer: paste | Separated into two layers Upper layer: liquid Lower layer: paste | Separated into two layers Upper layer: liquid Lower layer: paste |
| Viscosity (cp) | 3,000(31° C) | 2,900(29° C) | — | — | — | — |
| pH | 8.1 | 7.5 | — | — | — | — |

EXAMPLES 5 AND 6, AND COMPARATIVE EXAMPLES 5 AND 6

Comparison of degradation time between the case wherein aliphatic diol was used alone as a solvent, with the case wherein a mixture of aliphatic diol and monoalkanolamine was used as a solvent, was effected. The degradation reaction was effected in the same manner as described in Example 1, and the effect of the addition of monoalkanolamine was examined by varying the degradation temperature. In the degradation reaction, 200 g of rigid polyurethane foam (A) was used. The obtained results are shown in the following Table 8.

minutes, and the resulting mixture was heated at 180°±5° C for 30 minutes under stirring to obtain 1,240 g of a reddish brown homogeneous liquid.

The results of analysis of the resulting liquid (referred to as recovered polyol (III)) are shown in the following Table 9.

EXAMPLE 8

In the same manner as described in Example 1, 700 g of rigid polyurethane foam (B) was heat treated at 190°±5° C in a solvent composed of 665 g of dipropylene glycol and 35 g of monoethanolamine. In this treatment, rigid polyurethane foam (B) was added to the solvent in 120 minutes, and then the resulting mixture Table 8

|  | Example | | Comparative Example | |
|---|---|---|---|---|
|  | 5 | 6 | 5 | 6 |
| Solvent (g) | | | | |
| Diethylene glycol | 190 | 190 | 200 | 200 |
| Monoethanolamine | 10 | 10 | 0 | 0 |
| Degradation condition | | | | |
| Temperature (° C) | 160±5 | 195±5 | 160±5 | 195±5 |
| Time (min) | 26 | 20 | 43 | 30 |
| Recovered amount of degradation product (g) | 372 | 342 | 374 | 340 |
| Properties of degradation product | | | | |
| Viscosity (cp) | — | 1,420 (39° C) | — | 2,650 (32° C) |
| pH | — | 7.3 | — | 8.0 |
| Hydroxyl value (mgKOH/g) | — | 605 | — | 530.1 |
| Acid value (mgKOH/g) | — | 1.55 | — | 2.55 |
| Water content (%) | — | 1.81 | — | 1.66 |

It can be seen from Table 8, that the presence of monoethanolamine in a solvent can reduce the degradation time of rigid polyurethane foam and further can was heated at 190°±5° C for 35 minutes under thorough stirring to obtain 1,180 g of a reddish brown homogeneous liquid. The results of analysis of the resulting liquid (referred to as recovered polyol (IV)) are shown in Table 9.

Table 9

| | Viscosity (cp) | pH | Hydroxyl value (mgKOH/g) | Acid value (mgKOH/g) | Water content (%) |
|---|---|---|---|---|---|
| Degradation product in Example 7, recovered polyol (III) | 2,750 (27° C) | 4.4 | 570.5 | 9.28 | 0.39 |
| Degradation product in Example 8, recovered polyol (IV) | 17,400 (26° C) | 4.5 | 515.8 | 11.8 | 0.29 |

It can be seen from Table 9 that the recovered polyols (III) and (IV) can be directly reused as a polyol component for the production of rigid polyurethane foam.

Then, rigid polyurethane foams were produced by the use of the recovered polyol (III) or (IV). The following Table 10 shows the formulation in the production of the polyurethane foams and the physical properties of the resulting polyurethane foams. It was found from Table 10 that the rigid polyurethane foams, which were prepared by using the recovered polyol (III) or (IV) as one component of polyol, were able to be used satisfactorily as a heat insulating material.

Table 10

| | polyurethane foam using recovered polyol (III) | polyurethane foam using recovered polyol (IV) |
|---|---|---|
| Formulation (Parts) | | |
| SU-450M | 60 | 60 |
| Recovered polyol (III) | 40 | 0 |
| Recovered polyol (IV) | 0 | 40 |
| A 33% solution of triethylenediamine in dipropylene glycol | 0.1 | 0.1 |
| Dimethylethanolamine | 2.0 | 2.0 |
| Flame retardant: TDCP | 15 | 15 |
| Foaming agent: Freon-11 | 35 | 35 |
| Foaming agent: Water | 2.0 | 2.0 |
| MR (MDI) | 137 | 133 |
| Physical properties of foam | | |
| Specific gravity | 0.027 | 0.028 |
| Compression strength in foaming direction (Kg/cm²) | 2.01 | 2.20 |
| Compression strength in transverse direction (Kg/cm²) | 0.85 | 0.78 |

Table 10-continued

| | polyurethane foam using recovered polyol (III) | polyurethane foam using recovered polyol (IV) |
|---|---|---|
| Dimensional change at high temperature (70° C × 48 hrs.) (%) | +0.3 | +0.4 |
| Dimensional change at low temperature (−30° C × 24 hrs.) (%) | −0.8 | −0.9 |
| Thermal conductivity (Kcal/m.h. ° C) | 0.0183 | 0.0179 |
| Bending strength in foaming direction (Kg/cm²) | 3.2 | 3.4 |

EXAMPLES 9 AND 10, AND COMPARATIVE EXAMPLES 7–10

Experiments were effected by the use of monoethanolamine, diethanolamine or triethanolamine as one component of solvent in order to ascertain the effect of monoalkanolamine to be used as one component of the solvent in the present invention. In the experiment, 200 g of rigid polyurethane foam (B) was used. The following Table 11 shows the degradation condition and the properties of the degradation products.

It can be seen from Table 11 that all of the degradation products are one-layered homogeneous liquids, but when diethanolamine or triethanolamine is used as one component of solvent (Comparative Examples 7–10), a long degradation time is required, and particularly the degradation time at low temperature is more than about 1.5 times of the degradation time required in the present invention, and therefore the use of diethanolamine or triethanolamine as one component of solvent is not practicable. That is, it is a most important problem to select a proper solvent to be used in the degradation of rigid polyurethane foam in the present invention.

Table 11

| | Example 9 | Comparative Example 7 | Comparative Example 8 | Example 10 | Comparative Example 9 | Comparative Example 10 |
|---|---|---|---|---|---|---|
| Solvent (g) | | | | | | |
| Diethylene glycol | 190 | 190 | 190 | 190 | 190 | 190 |
| Monoethanolamine | 10 | — | — | 10 | — | — |
| Diethanolamine | — | 10 | — | — | 10 | — |
| Triethanolamine | — | — | 10 | — | — | 10 |
| Degradation condition | | | | | | |
| Temperature (° C) | 160±5 | 160±5 | 160±5 | 195±5 | 195±5 | 195±5 |
| Time (min) | 26 | 40 | 40 | 20 | 24 | 24 |
| Recovered amount of degradation product (g) | 372 | 358 | 360 | 342 | 340 | 345 |
| Properties of degradation product | | | | | | |
| Viscosity (cp) | — | — | — | 1,420 (31° C) | 2,420 (32° C) | 2,120 (29° C) |
| Hydroxyl value (mgKOH/g) | — | — | — | 605 | 604.4 | 596.5 |
| Acid value (mgKOH/g) | — | — | — | 1.55 | 1.55 | 1.33 |

EXAMPLES 11 AND 12

A polyisocyanurate foam was prepared by compounding and foaming 100 parts of Hxacal SN (an isocyanate compound having isocyanurate groups, made by Nippon Polyurethane Kogyo Co.), 18 parts of Freon-11 and 29 parts of Hexacal S'-3 (a polyol made by Nippon Polyurethane Kogyo Co.). The polyisocyanurate foam had the following physical properties.

| | | |
|---|---|---|
| Density | 0.037 | g/cm³ |
| Compression strength in foaming direction | 2.92 | Kg/cm² |
| Compression strength in transverse direction | 1.16 | Kg/cm² |
| Bending strength in foaming direction | 2.4 | Kg/cm² |

In a mixture composed of diethylene glycol and monoethanolamine was dissolved 200 g of the above obtained polyisocyanurate foam, and the resulting solution was heat treated to obtain a polyol-containing homogeneous liquid degradation composition. The following Table 12 shows the results.

It can be seen from Table 12 that the recovered homogeneous liquid degradation composition has sufficiently excellent properties to be directly reused as a polyol component for the production of polyisocyanurate foam.

Table 12

| | Example 11 | Example 12 |
|---|---|---|
| Solvent (g) | | |
| Diethylene glycol | 285 | 380 |
| Monoethanolamine | 15 | 20 |
| Degradation condition | | |
| Temperature (° C) | 195±5 | 195±5 |
| Time (min) | 50 | 35 |
| Properties of recovered liquid degradation composition | | |
| Viscosity at 25° C (cp) | 8,200 | 2,850 |
| pH | 6.7 | 6.7 |

What is claimed is:

1. A process for obtaining a polyol-containing homogeneous liquid composition, which can be directly reused as a polyol component for the production of rigid polyether polyurethane foam, from a rigid polyurethane foam, which comprises treating said rigid polyurethane foam at a temperature of from 150° to 220° C in the presence of a mixture of (a) an aliphatic diol having 4–7 carbon atoms and having a boiling point higher than 160° C and (b) a monoalkanolamine having 2–8 carbon atoms, the amount of said monoalkanolamine (b) present in said mixture being within the range of from 1 to 20 percent by weight.

2. A process according to claim 1, wherein said aliphatic diol (a) is at least one member selected from the class consisting of diethylene glycol, dipropylene glycol, 1,4-butanediol and 1,5-pentanediol.

3. A process according to claim 1, wherein said monoalkanolamine (b) is monoethanolamine.

4. A process according to claim 1, wherein the amount of the monoalkanolamine present in the mixture of the aliphatic diol and the monoalkanolamine is within the range of from 2 to 10 percent by weight.

5. A process according to claim 1, wherein the temperature for treating the rigid polyurethane foam for the degradation is within the range of from 160° to 210° C.

* * * * *